US009821610B2

(12) United States Patent
Okita

(10) Patent No.: US 9,821,610 B2
(45) Date of Patent: Nov. 21, 2017

(54) PNEUMATIC TIRE FOR AIRCRAFT

(71) Applicant: BRIDGESTONE CORPORATION, Chuo-ku, Tokyo (JP)

(72) Inventor: Yohei Okita, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 182 days.

(21) Appl. No.: 14/784,581

(22) PCT Filed: Apr. 14, 2014

(86) PCT No.: PCT/JP2014/060641
§ 371 (c)(1),
(2) Date: Oct. 15, 2015

(87) PCT Pub. No.: WO2014/175103
PCT Pub. Date: Oct. 30, 2014

(65) Prior Publication Data
US 2016/0068026 A1 Mar. 10, 2016

(30) Foreign Application Priority Data
Apr. 23, 2013 (JP) ................................. 2013-090761

(51) Int. Cl.
*B60C 11/24* (2006.01)
(52) U.S. Cl.
CPC .......... *B60C 11/24* (2013.01); *B60C 2200/02* (2013.01)
(58) Field of Classification Search
CPC .................................................... B60C 11/24
See application file for complete search history.

(56) References Cited

U.S. PATENT DOCUMENTS 3,261,388 A * 7/1966 Kovac ....................... B60C 9/20
116/208
3,674,076 A * 7/1972 Dailey, Jr. ........... B60C 11/0306
152/209.18
(Continued)

FOREIGN PATENT DOCUMENTS

EP 2236318 A1 10/2010
GB 978129 A 12/1964
(Continued)

OTHER PUBLICATIONS

English machine translation of JP03-038416, dated Feb. 1991.*
European Search Report dated Feb. 11, 2016, issued in corresponding EP Patent Application.

*Primary Examiner* — Robert Dye
(74) *Attorney, Agent, or Firm* — Solaris Intellectual Property Group, PLLC

(57) ABSTRACT

An object is to make it make it possible to, before a protecting layer is exposed, visually recognize that a final stage of wear of a tread has been reached. A pneumatic tire (10) for an aircraft has: a carcass ply (12) that spans between a pair of bead portions; a belt layer (14) that is provided at a tire radial direction outer side of a crown portion (12A) of the carcass ply (12); a protecting layer (16) that is provided at a tire radial direction outer side of the belt layer (14); a tread (18) that is provided at a tire radial direction outer side of the protecting layer (16), and at which ribs (30, 32, 34) are demarcated and formed by circumferential direction grooves; and filaments (20) that are provided between the protecting layer (16) and the tread (18), or within the tread (18), that extend in a tire axial direction, and that are disposed with an interval therebetween in a tire circumferential direction.

2 Claims, 2 Drawing Sheets

(56) References Cited

U.S. PATENT DOCUMENTS

| | | | | |
|---|---|---|---|---|
| 4,226,274 | A * | 10/1980 | Awaya | B60C 11/24 |
| | | | | 152/154.2 |
| 7,032,638 | B2 * | 4/2006 | Herbelleau | B60C 9/2009 |
| | | | | 152/527 |
| 2003/0201046 | A1 | 10/2003 | Rayman et al. | |
| 2005/0194081 | A1 | 9/2005 | Yano et al. | |
| 2009/0032156 | A1 | 2/2009 | Stewart | |
| 2013/0034718 | A1 | 2/2013 | Nair et al. | |

FOREIGN PATENT DOCUMENTS

| | | |
|---|---|---|
| JP | H03-038416 A | 2/1991 |
| JP | H03-045404 A | 2/1991 |
| JP | 4424989 B2 | 3/2010 |
| WO | 03/061991 A1 | 7/2003 |

\* cited by examiner

PNEUMATIC TIRE FOR AIRCRAFT

TECHNICAL FIELD

The present invention relates to a pneumatic tire for an aircraft.

BACKGROUND ART

Japanese Patent No. 4424989 discloses a structure in which a protecting layer is disposed between belt layers and a tread in a pneumatic radial tire that is suitable for an aircraft.

SUMMARY OF INVENTION

Technical Problem

At a pneumatic tire for an aircraft, when the tread wears down and the remaining groove depth of the circumferential direction grooves decreases to a predetermined value, it is considered that the final stage of wear of the tread has been reached, and the tire is removed from the aircraft. Accordingly, even if ribs that are places other than the grooves become locally worn, if the remaining groove width has not decreased to the predetermined value, that state is not recognized as being the final stage of wear of the tread, depending on the usage conditions and the like.

In view of the above-described circumstances, an object of the present invention is to make it possible to, before a protecting layer is exposed, visually recognize that the final stage of wear of a tread has been reached.

Solution to Problem

A pneumatic tire for a aircraft relating to a first aspect of the present invention comprises: a carcass ply that spans between a pair of bead portions; a belt layer that is provided at a tire radial direction outer side of a crown portion of the carcass ply; a protecting layer that is provided at a tire radial direction outer side of the belt layer; a tread that is provided at a tire radial direction outer side of the protecting layer, and at which ribs are demarcated and formed by circumferential direction grooves; and filaments that are provided between the protecting layer and the tread, or within the tread, that extend in a tire axial direction, and that are disposed with an interval therebetween in a tire circumferential direction.

In this pneumatic tire for an aircraft, the filaments are provided between the protecting layer and the tread, or within the tread. Therefore, in a case in which wear of the ribs progresses locally before the remaining groove depth of the circumferential direction grooves decreases to a predetermined value, the filaments are exposed first. Thus, before the protecting layer is exposed, it can be visually recognized that the final stage of wear of the tread has been reached.

In a second aspect of the present invention, in the pneumatic tire for an aircraft relating to the first aspect, both ends of the filaments in the tire axial direction have the same positions as both ends of the belt layer in the tire axial direction, or are positioned further toward tire axial direction outer sides than both ends of the belt layer.

In this pneumatic tire for an aircraft, the both ends of the filaments in the tire axial direction have the same positions as both ends of the belt layer in the tire axial direction, or are positioned further toward the tire axial direction outer sides than both ends of the belt layer. Therefore, at the time when wear of the ribs progresses locally, the belt layer becoming exposed before the filaments, at regions apart from the protecting layer, is suppressed. Thus, before the belt layer is exposed, it can be visually recognized that the final stage of wear of the tread has been reached.

Advantageous Effects of Invention

In accordance with pneumatic tire for an aircraft relating to the present invention, the excellent effect is obtained that, before a protecting layer or a belt layer is exposed, it is possible to visually recognize that the final stage of wear of a tread has been reached.

DESCRIPTION OF EMBODIMENTS

Figure 1:
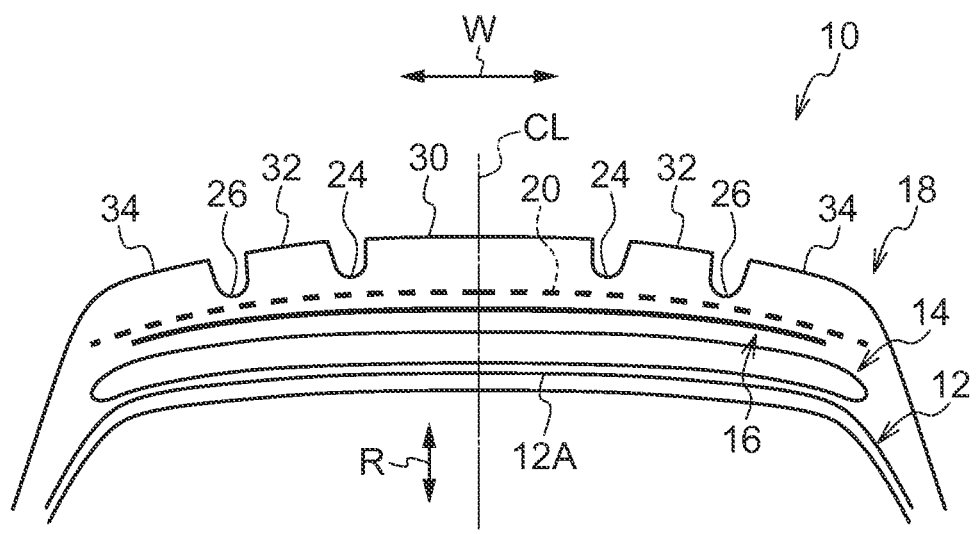
FIG. 1 is a cross-sectional view showing a pneumatic tire for an aircraft that is cut at a plane that includes a tire rotational axis.

An exemplary embodiment of the present invention are described hereinafter on the basis of the drawings. In the drawings, the arrow R direction indicates the tire radial direction, and the arrow W direction indicates the tire axial direction. The direction of moving further from the tire rotational axis (not illustrated) is called the "tire radial direction outer side". The direction of moving further from a tire equatorial plane CL is called the tire axial direction outer side, and the direction of approaching the tire equatorial plane CL is called the tire axial direction inner side.

In FIG. 1, a pneumatic tire 10 for an aircraft relating to the present embodiment has a carcass ply 12 that span between a pair of bead portions (not illustrated), a belt layer 14, a protecting layer 16, a tread 18 and filaments 20.

Figure 2:
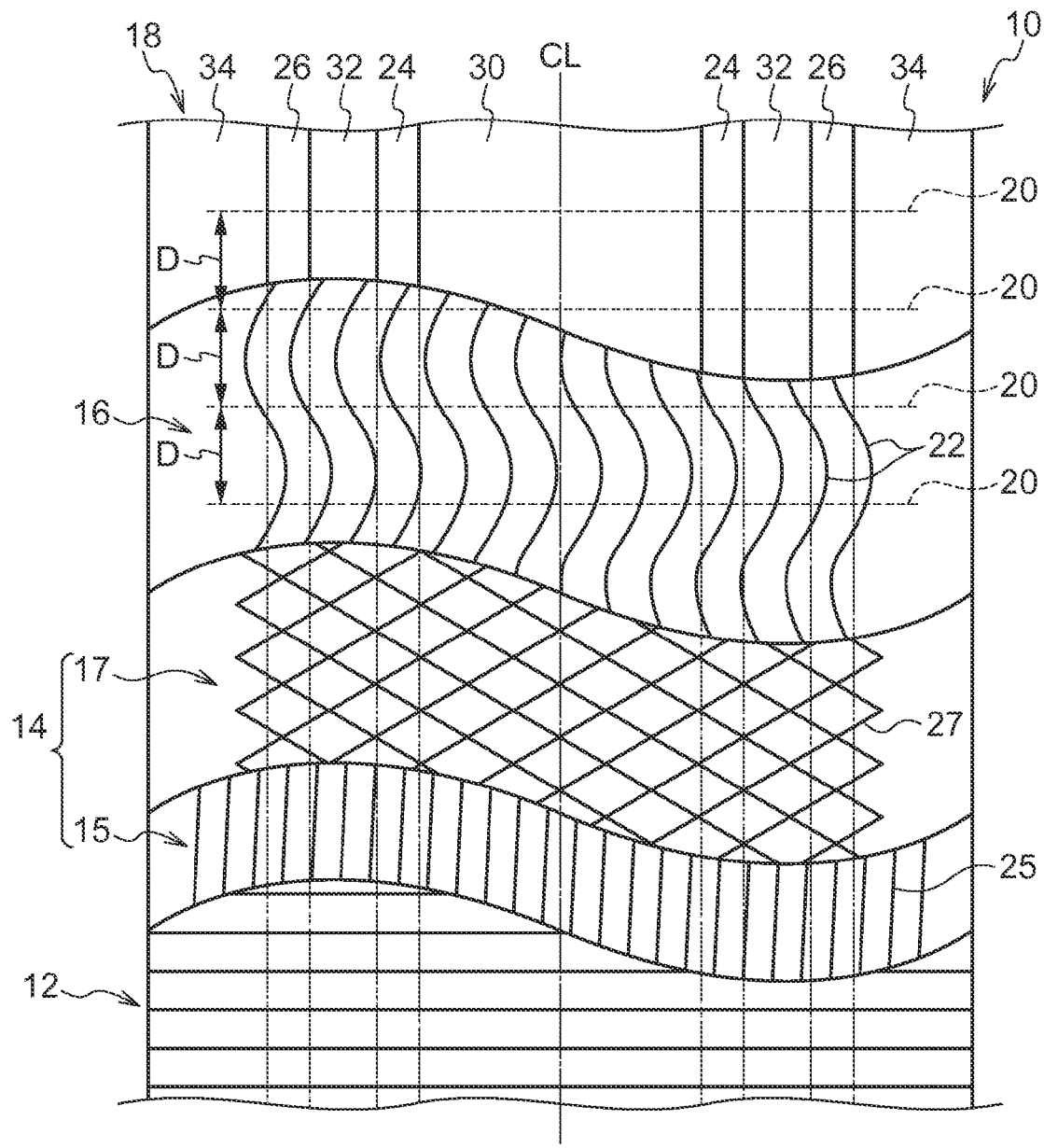
FIG. 2 is a partial, broken development showing the structure of a tread and layers therebeneath.

The belt layer 14 is provided at the tire radial direction outer side of a crown portion 12A of the carcass ply 12. As shown in FIG. 2, the belt layer 14 is structured by, for example, six main belt layers 15 and one auxiliary belt layer 17. Each of the main belt layers 15 is structured to include cords 25 that are wound in spiral forms in the tire circumferential direction. The cords 25 are structured by organic fibers (e.g., aromatic polyamide). The auxiliary belt layer 17 is structured to include plural cords 27 that are inclined at an angle of, for example, 2~25° with respect to the tire equatorial plane CL, and that are bent within the same plane so as to be inclined in opposite directions at the tire axial direction end portions, and that extend in zigzag forms in the tire circumferential direction. The cords 27 are structured by organic fibers (e.g., aliphatic polyamide).

The protecting layer 16 is provided at the tire radial direction outer side of the belt layer 14. This protecting layer 16 is a layer in which plural wave-shaped cords 22, that extend in wave shapes in the tire circumferential direction, are lined-up parallel to one another and are coated with rubber. The wave-shaped cords 22 are structured by organic fibers (e.g., aliphatic polyamide).

The tread 18 is provided at the tire radial direction outer side of the protecting layer 16, and ribs 30, 32, 34 are demarcated and formed thereat by, for example, four circumferential direction grooves 24, 26. The rib 30 is demarcated by the circumferential direction grooves 24 at the both sides of the tire equatorial plane CL, and is positioned at the central portion in the tire axial direction that includes the tire equatorial plane CL. The ribs 32 are demarcated by the circumferential direction grooves 24, 26, and are narrower than the rib 30 that is at the central portion. The ribs 34 are demarcated by the circumferential direction grooves 26, and are positioned at the tire axial direction outer sides of these circumferential direction grooves 26. The ribs 32, 34 are respectively formed at both sides of the tire equatorial plane CL. Note that the number of the circumferential direction grooves may be six. In this case, the number of ribs also increases.

The filaments 20 are provided between the protecting layer 16 and the tread 18, or within the tread 18, and extend in the tire axial direction, and are disposed with an interval therebetween in the tire circumferential direction. At least twelve of the filaments 20 are disposed in the tire circumferential direction. This is in order for at least one of the filaments 20 to be positioned at a layer beneath of the ground-contact range of the pneumatic tire 10 for an aircraft. On the other hand, the minimum value of an interval D between the filaments 20 that are adjacent to one another the tire circumferential direction is around 20~30 mm. This is in order to suppress the occurrence of separation that is due to the interval D being too narrow. This interval D may be constant, or may be unequal. The filaments 20 are structured by organic fibers (e.g., aliphatic polyamide), but the material thereof is not limited to this, and another material may be used.

The both ends of the filaments 20 in the tire axial direction have the same positions as both ends of the belt layer 14 in the tire axial direction, or are positioned further toward the tire axial direction outer sides than both ends of the belt layer 14. Concretely, the lengths and the positions of the filaments 20 in the tire axial direction are equivalent to the width and the position of the belt layer 14. This is in order to make it such that the belt layer 14 is not exposed before the filaments 20 at the time when local wear arises at the tread 18. Note that the range of the filaments 20 in the tire axial direction may be narrower than or may be wider than the range of the belt layer 14.

The arrangement of the filaments 20 is not limited to being parallel to the tire axial direction, and may be inclined with respect to the tire axial direction. Further, the filaments 20 that are adjacent to one another in the tire circumferential direction do not have to be parallel to one another. Moreover, the filaments 20 may be disposed so as to be divided into shorter pieces in the tire axial direction. Further, the both end portions of the filaments 20 may be respectively connected by lengthwise threads (not illustrated) that extend in the tire circumferential direction grooves, and the filaments 20 may be structured in the shape of a ladder on the whole. Moreover, the filaments 20 may be disposed within the ribs 30, 32, 34.

The filaments 20 may be disposed so as to be divided into shorter pieces in the tire axial direction, and the interval D in the tire circumferential direction may be varied in accordance with the widths of the ribs 30, 32, 34. For example, the interval D of the filaments 20 that are positioned in the layer beneath of the rib 30 that is relatively wide can be made to be small, and the interval D of the filaments 20 that are positioned in the layer beneath of the ribs 32, 34 that are relatively narrow can be made to be wide.

Operation

The present embodiment is structured as described above, and the operation thereof is described hereinafter. In FIG. 1, at the pneumatic tire 10 for an aircraft relating to the present embodiment, the filaments 20 are provided between the protecting layer 16 and the tread 18, or within the tread 18. Therefore, in a case in which wear of the ribs progresses locally before the remaining groove depth of the circumferential direction grooves 24, 26 decreases to a predetermined value, the filaments 20 are exposed first. Thus, before the protecting layer 16 is exposed, it can be visually recognized that the final stage of wear of the tread 18 has been reached.

Further, the both ends of the filaments 20 in the tire axial direction have the same positions as both ends of the belt layer 14 in the tire axial direction, or are positioned further toward the tire axial direction outer sides than both ends of the belt layer 14. Therefore, at the time when wear of the ribs 30, 32, 34 progresses locally, the belt layer 14 becoming exposed before the filaments 20, at regions apart from the protecting layer 16, is suppressed. Thus, before the belt layer 14 is exposed, it can be visually recognized that the final stage of wear of the tread 18 has been reached.

The disclosure of Japanese Patent Application No. 2013-90761 filed on Apr. 23, 2013 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS 10 pneumatic tire for an aircraft
12 carcass ply
12A crown portion
14 belt layer
16 protecting layer
18 tread
20 filament
24 circumferential direction groove
26 circumferential direction groove
30 rib
32 rib
34 rib

The invention claimed is:

1. A pneumatic tire for an aircraft, comprising:
a carcass ply that spans between a pair of bead portions;
a belt layer that is provided at a tire radial direction outer side of a crown portion of the carcass ply;
a protecting layer that is provided at a tire radial direction outer side of the belt layer;
a tread that is provided at a tire radial direction outer side of the protecting layer, and at which a rib that is relatively wide and a rib that is relatively narrow are demarcated and formed by circumferential direction grooves; and
filaments that are provided between the protecting layer and the tread, or within the tread, that extend in a tire axial direction, and that are disposed with an interval therebetween in a tire circumferential direction, wherein
an interval, in the tire circumferential direction, of the filaments that are positioned in a layer beneath the rib that is relatively wide is smaller than an interval, in the tire circumferential direction, of the filaments that are positioned in a layer beneath the rib that is relatively narrow.

2. The pneumatic tire for an aircraft of claim 1, wherein both ends of the filaments in the tire axial direction have the same positions as both ends of the belt layer in the tire axial direction, or are positioned further toward tire axial direction outer sides than both ends of the belt layer.

\* \* \* \* \*